United States Patent Office 2,779,682
Patented Jan. 29, 1957

2,779,682
PLASTER COMPOSITION FOR USE IN COLLAPSIBLE TUBES

Steven Langer, Jersey City, N. J.

No Drawing. Application April 12, 1954,
Serial No. 422,660

3 Claims. (Cl. 106—109)

This invention relates to patching, hole- or crack-filling plaster compositions and more particularly to compositions which may be kept for long periods of time yet may be used without special or any preparation or mixing more or less immediately prior to use.

Still more particularly, an object of the invention is to provide a plaster composition which may be kept for a long period of time, and in a state for immediate use, in a collapsible tube such as is used for dentifrice pastes, oil colors and the like.

Another object is to provide a patching or crack-filling composition which may be used in small quantities from time to time without any appreciable loss of materials.

Hitherto, the filling of holes and small cracks in plaster walls and the like has required the mixing of dry powdery material with more or less exact proportions of water. To get a proper proportion, while using only household facilities as are usually available, relatively large quantities of powder and water were required and the mixing equipment became heavily coated with the plastic filler with a large part of material being lost and presenting a cleaning or disposal problem. Furthermore the material would often set too rapidly to permit its use when later needs for it were discovered.

To attain the objects mentioned above and to obtain advantages not presented in the prior art, I provide a composition comprising a substantially insoluble powder intimately mixed with a liquid vehicle containing a suspending or stabilizing agent.

For the powder I prefer calcium sulfate dihydrate since most plaster is now of the gypsum type and it is desirable to employ a base having characteristics similar to those of the walls with which it is to be in contact. However I may employ other suitable substantially insoluble powders which are substantially inert toward paint.

As vehicle I prefer water since it is not likely to produce bleeding when the dried composition is covered with paint and because it is readily absorbed or adsorbed by the portions of the walls surrounding the area to which the composition is applied, so as to hasten the drying and hardening of the composition after it is applied. Also water is the preferred vehicle because the calcium sulfate dihydrate is slightly soluble therein, thus enabling the formation of crystals of microscopic size to cement the relatively large particles of the powder together as the water dries out.

The selection of the stabilizer is most important. It must have water compatibility with calcium sulfate and also water retention properties so that the reaction involved in the hardening of the calcium sulfate would be temporarily suspended by the prevention of the dehydration of the plaster.

Such emulsifying or suspending agents as sodium alginate, ethyl cellulose, diethylene glycol monostearate and gelatin were not satisfactory.

Carboxymethylcellulose proved to be very satisfactory as a suspending agent and celluronic acid may also be used. Carboxymethylcellulose not only is resistant to most organic solvents, oils, fats and waxes, but, as it drys, cements powder particles together and prevents undue shrinkage of the mass. The same is essentially true of celluronic acid.

The amount of suspending agent is rather critical. It should be within a range of about 3.0% to 5.0% of the weight of $CaSO_4.2H_2O$ (air dry basis). The amount of water is also critical since the material must dry within a reasonable length of time and not shrink, and the composition must be extrudable from a tube. The amount of water is preferably about ⅔ the weight of the $CaSO_42H_2O$ (air dry) although the weight of the water may be from about 53% to 75% the weight of the sulfate.

It is essential that all components be well mixed and that the composition be homogeneous. In general a small amount of inert coloring material may be added but for most purposes this is not necessary.

While I have generally described the composition as a crack-filler its use is not to be construed as so limited. For example the composition may be used as material which artists may shape into various forms while in the plaster state, or which when dry may be graved.

For use as a crack-filler, the plastic damp composition is packed in collapsible tubes, sealed and marketed as such. The composition may be applied by bringing the nipple of the tube adjacent the area to which the composition is applied and squeezing the tube to inject the composition directly into the hole or recess and finishing flush with the usual tool.

The composition dries in about the same length of time as ordinary plaster after being applied, but shows no tendency to harden in the tube for a period of at least several weeks.

Having thus described my invention, I give as a specific example next below, one manner in which my invention is made, but those skilled in the art will realize that many changes may be made without departing from the spirit of the invention.

To 50 parts by weight of hot (200° F.) water, 2.5 parts by weight of carboxymethylcellulose of 120 C. P. viscosity manufactured by Hercules Powder Co. was added using a mechanical mixer to effect solution. To this solution 75 parts by weight of $CaSO_4.2H_2O$ was slowly added with constant agitation until a homogeneous mixture was obtained. The mixture was then cooled and poured into collapsible tubes and the latter sealed. The mixture when allowed to dry in open air had the general properties of plaster.

In all instances where proportions of carboxymethylcellulose are mentioned it is to be understood that reference is made to the 120 centipoise grade.

The invention claimed is:

1. A composition comprising by weight about 100 parts of calcium sulfate dihydrate, between 3.0 and 5.0 parts of a cellulosic acid taken from the group consisting of carboxymethylcellulose and celluronic acid and sufficient water to form an extrudable plastic mass.

2. A composition for patching plaster comprising by weight 100 parts $CaSO_42H_2O$, from 3 to 5 parts carboxymethylcellulose, and from 53 to 75 parts water.

3. A composition for patching plaster comprising a homogeneous mixture of, by weight, 50 parts water, 2.5 parts carboxymethylcellulose, and 75 parts $CaSO_42H_2O$.

References Cited in the file of this patent

UNITED STATES PATENTS

| | | |
|---|---|---|
| 1,868,851 | Rocker | July 26, 1932 |
| 2,371,688 | Gold | Mar. 20, 1945 |
| 2,398,047 | Schmidt | Apr. 9, 1946 |
| 2,640,791 | Barber | June 2, 1953 |
| 2,649,999 | Burch | Aug. 25, 1953 |

FOREIGN PATENTS

| | | |
|---|---|---|
| 259,646 | Switzerland | June 16, 1949 |